United States Patent Office 2,851,391
Patented Sept. 9, 1958

2,851,391
PROCESSES AND PRODUCTS

Henry J. Gerjovich, Terrence D. McGowan, and John W. Trebilcock, Wilmington, Del., assignors to E. I. du Pont de Nemours and Company, Wilmington, Del., a corporation of Delaware No Drawing. Application July 19, 1957
Serial No. 672,876

5 Claims. (Cl. 167—33)

This invention relates to esters of 2-carboxyimino- or thiocarboxyimino-3-benzothiazoline or -benzoxazoline carboxylic acids; to a process for the preparation of these esters; and to fungicidal compositions and methods employing these esters.

It has been found that compounds represented by the following formula possess outstanding fungicidal activity:

(1)

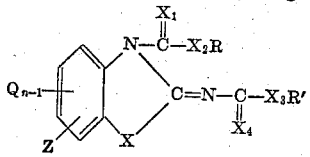

wherein Z is selected from the group consisting of hydrogen and nitro; Q is a halogen, that is chlorine, fluorine, bromine or iodine; $n$ is a whole positive integer of less than 4, that is 1, 2 or 3; X, $X_1$, $X_2$, $X_3$ and $X_4$ can be the same or different and are selected from the group consisting of oxygen and sulfur; and R and R' can be the same or different and are alkyl or alkenyl groups containing less than 5 carbon atoms.

From the standpoint of ease and economy of preparation and effectiveness of usage, those compounds represented by Formula 1 wherein X is sulfur and $X_1$, $X_2$, $X_3$ and $X_4$ are oxygen are the preferred compounds. Also, from the standpoint of ease and economy of preparation, the better compounds are those where R and R' are the same and are methyl or ethyl.

In accordance with the present invention, it has been found that the compounds of Formula 1 can be prepared rapidly and in high yield by reacting the hydrochloride salt of a suitably substituted 2-aminobenzothiazole or 2-aminobenzoxazole with a lower alkanol chloroformate or thiochloroformate in aqueous medium as illustrated by the following equation:

(2)

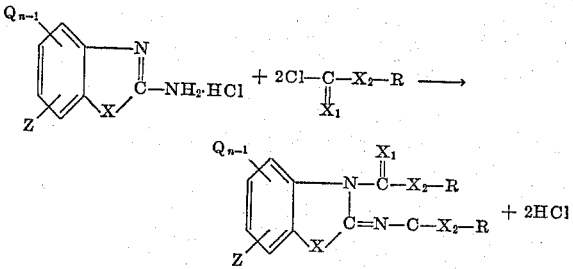

The desired ester product forms as a precipitate in the reaction medium, and can be isolated by filtration followed by water washing. The resultant product is suitable for use in the fungicidal compositions and methods of the present invention.

The water-soluble hydrochloride salt of the heterocyclic amine is first formed by the addition of a stoichiometric amount of hydrochloric acid to an aqueous amine slurry. While the addition of small excesses of hydrochloric acid can be tolerated, the use of any substantial excess of hydrochloric acid should be avoided.

In carrying out the reaction of Equation 2, the temperature ordinarily is maintained at about room temperature. While temperatures as low as about 10° C., or even somewhat lower can be used in this reaction, they are not preferred because they give decreased reaction rates. Likewise, while relatively high temperatures can be employed, they are ordinarily avoided because they bring about excessive decomposition of the chloroformate. In general, the temperature employed is in the range of about 20–60° C., with a temperature of about 30–55° C. being about the best from the standpoint of reaction rate and minimum chloroformate decomposition.

For this reaction to proceed satisfactorily, it has been found that the pH of the reaction mass must be maintained within the range pH 2.0 to 6.0. For the optimum yield of high purity material a pH within the range of 3.0 to 5.0, and more preferably from 3.5 to 4.0 is employed. If a pH lower than about 2.0 is employed, the reaction rate is considerably slowed. On the other hand, pH's above about 6.0 cannot be used because the amine hydrochloride does not exist in appreciable amounts at higher pH's.

To maintain the pH within the required range, it is necessary to add an acid acceptor to the reaction medium. For this purpose excellent results are obtained by adding an alkali or alkaline earth metal base. The alkali or alkaline earth metal base may be in the form of a hydroxide such as sodium or potassium hydroxide. Alternatively, basic salts such as sodium acetate, basic phosphates, carbonate and bicarbonate salts, and tertiary amines can be used. The carbonate and bicarbonate salts are sometimes less desirable because the evolution of carbon dioxide tends to form a foam.

To give substantially complete reaction with the amine hydrochloride, a minimum mole ratio of alkanol chloroformate to amine hydrochloride of 2 is required, as is indicated in Equation 2. Ordinarily, however, a mole ratio of from about 2.0 to 4.0 is used to allow for some hydrolysis of the alkanol chloroformate.

Because this reaction proceeds rapidly to give a substantially pure product that can be recovered by simple filtration, it is ideally suited for continuous operation. For example, it can be operated on a large commercial scale in a pipe reactor. The reactants are introduced into one end of the reactor, with the reaction product leaving the other end to be filtered, dried and packaged. The acid acceptor that is required for pH control is introduced at several spaced locations along the length of the pipe reactor. In this manner large quantities of product can be obtained simply and rapidly without requiring extensive equipment.

It should be pointed out that ordinarily this process is carried out to produce a single compound symmetrically substituted by the chloroformate group; that is, $X_1$ and $X_4$ are the same, $X_2$ and $X_3$ are the same, and R and R' are the same. However, in many instances it is desirable to form unsymmetrical compounds. This can be done by using a mixture of chloroformates in preparing the compounds. Thus, where a mixture of methyl and ethyl chloroformates are employed, four products are produced, namely the compounds where R and R' are both methyl or both ethyl, and the compounds where R is methyl and R' is ethyl, or R is ethyl and R' is methyl. These mixed products can be employed as such in the fungicidal compositions and methods of the present invention. Alternatively, they can be separated to isolate high purity unsymmetrical compounds.

As aforementioned, it has been found that the compounds represented by Formula 1 possess outstanding fungicidal activity. Specifically, it has been found that these compounds not only control a wide variety of fungus diseases, but furthermore certain of these compounds control powdery mildew without damaging the fruit.

Also, certain of these compounds have exhibited systemic fungicidal activity, a unique type of activity that heretofore has been found in almost no other compounds. Because of this systemic activity, these fungicides can be applied to the soil to give control of fungus infestation of the aerial parts of the plant.

In practicing the fungicidal methods of our invention, one or more of the active ingredients is applied to the organic material to be treated for the control of fungi at a dosage sufficient to exert fungicidal action. Accordingly, our compositions and methods are applicable for the protection of carbohydrates, proteins and fats. They are particularly suited for the treating of plants such as seeds, vegetables, ornamental plants and fruit-bearing trees. Some of these compositions are also effective when applied directly to the soil for controlling plant fungi. Also they can be used to treat organic fibers and fabrics and various cellulosic material such as leather and wood. Likewise they can be used to treat paints and lubricating oils.

In application to plants, fungicidal control is obtained in most instances by applying the active compound at a dosage or rate from about 0.5 to 10.0 pounds per acre, the optimum amount within this range being largely dependent upon the variables mentioned heretofore. In application directly to the soil for use as a systemic fungicide, in most instances, the dosage or rate is from about 1 to 75 pounds per acre. The optimum dosage can be determined in each instance by one of the means conventional in the art. It is, of course, determined by and dependent upon the particular fungicidal compound selected, the method of application, and, in the case of application to vegetation, the state and condition of growth of the vegetation to be treated, and the climatic conditions.

The fungicidal compositions of our invention contain in sufficient amount to exert fungicidal action one or more of the above-described active compounds in admixture with a carrier material or conditioning agent of the kind used and commonly referred to in the art as a fungicide adjuvant or modifier. The conventional fungicide adjuvants are inert solids, hydrocarbon liquid diluents and surface-active agents. They provide formulations adapted for ready and efficient application using conventional applicator equipment. Usually from about 1-95% by weight of the fungicidal composition is active ingredient.

Solid compositions are preferably in the form of powders. They are compounded as homogeneous powders that can be either used as such, diluted with inert solids to form dusts, or suspended in a suitable liquid medium for spray application. The powders usually comprise active ingredient admixed with minor amounts of conditioning agent. Natural clays, either adsorptive such as attapulgite or relatively non-absorptive such as kaolin clays, diatomaceous earth, walnut shell flour, tobacco dust, redwood flour, synthetic fine silica, calcium silicate and other inert solid carriers of the kind conventionally employed in powder fungicidal compositions can be used. The active ingredient usually makes up from about 25-90% of these powder compositions. For conversion of the powders to dusts, talc, pyrophyllite, tobacco dust, volcanic ash and other dense, rapid-settling inert solids customarily are used.

Liquid compositions employing one or more of the fungicidally-active ingredients are prepared by admixing the active ingredient with a suitable liquid diluent medium. The active ingredient can be either in solution or in suspension in the liquid medium. Typical of the liquid media commonly employed as fungicide adjuvants are kerosene, Stoddard solvent, xylene, alcohols, alkylated naphthalene and glycols. The active ingredient usually makes up from about 0.5 to 50% of these liquid compositions. Some of these compositions are designed to be used as such, and others to be extended with large quantities of water.

Compositions in the form of wettable powders or liquids in many cases also include one or more surface-active agents such as wetting, dispersing or emulsifying agents. These materials cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, Nos. 7-10 (1955).

In some cases it may be desirable to employ the active compounds of the present invention in combination with other fungicides to give compositions that have broad spectrum fungicidal activity. In these mixtures, the fungicidally active materials can be present in any desired amount, ordinarily from about 0.1-20 parts by weight of a compound represented by Formula 1 per part by weight of the auxiliary fungicidally active material. In some instances it may even be desirable to employ two or more auxiliary fungicides.

Typical of the auxiliary fungicides that can be employed in combination with the compounds of the present invention are the following:

N-trichloro-methylthio-4-cyclohexene-1,2-dicarboximide
Tetramethylthiuram disulfide
Manganese ethylene-bis-dithiocarbamate
Ferric dimethyl dithiocarbamate
Zinc ethylene-bis-dithiocarbamate
Zinc dimethyl dithiocarbamate (ziram)
Tetra copper calcium oxychloride
Tetrachloro-p-benzoquinone (chloranil)
2,3-dichloro-1,4-naphthoquinone (dichlone)
2-dichloro-6-(o-chloroanilino)triazine (dyrene)
Ethylene thiuram monosulfide
2-heptadecyl glyoxalidine acetate (glyodin)
Ferric dimethyl dithiocarbamate plus 2-mercaptobenzothiazole
Manganese dimethyl dithiocarbamate plus 2-mercaptobenzothiazole
Copper dihydrazinium sulfate
Copper-8-quinolinolate
Cycloheximide
Terramycin
Streptomycin In order that the invention may be better understood, the following examples are given in addition to those already set forth above:

EXAMPLE 1

A stirred reaction vessel equipped with an agitator is charged with 150 parts of 2-aminobenzothiazole and 1000 parts of tap water. The pH is adjusted to 3.5 with 37% HCl. The resulting solution is then heated to 50° C. and maintained at this temperature. Commercial methyl chloroformate (244 parts) is added over a period of three hours concurrently with 900 parts of 2.72 N NaOH to maintain pH at 3.5-4.0. During this addition the product precipitates.

After the additions are complete the reaction mass is held at 50° with stirring for 0.5 hour and then filtered. The product is washed with 2000 parts of hot tap water (50° C.) and vacuum dried at 40° C.

238 parts of 2-carboxyimino-3-benzothiazoline carboxylic acid, dimethyl ester is obtained, melting with decomposition at 140-143° C. Ultraviolet and infra-red analysis show the product to be essentially pure.

*Analysis.*—Calc'd for: C, 49.6%; H, 3.89%; S, 12.05%; N, 10.51%. Found: C, 49.55%, 49.76%; H, 3.89%, 3.89%; S, 12.21%, 12.42%; N, 10.18%.

A 0.008% by weight water suspension of this compound is prepared and applied as a foliar spray to apple foliage infected with established powdery mildew (*Podosphaera leucotricha*). This treatment gives substantially complete control of the infection.

EXAMPLES 2-5

The following lower alkyl esters are prepared from 150 parts of 2-aminobenzothiazole in accordance with the procedure of Example 1, using the conditions set forth in Table I:

Table I

| Example No. | Chloroformate, Parts by Weight | Base by Wt., Parts | pH | Temp. | Product |
|---|---|---|---|---|---|
| 2 | ethylchloroformate, 238 parts | KOH, 125 parts | 3–3.5 | 35 | 2-carboxyimino-3-benzothiazole carboxylic acid, diethyl ester. |
| 3 | sec. butyl chloroformate, 285 parts | NaOH, 85 parts | 3.0 | 45 | di (sec.-butyl) ester. |
| 4 | n-butyl chloroformate, 285 parts | Ca(OH)$_2$, 77 parts | 3.0 | 45 | di (n-butyl) ester. |
| 5 | n-propyl chloroformate, 268 parts | NaC$_2$H$_3$O$_2$, 183 parts | 3–3.5 | 30–40 | di (n-propyl) ester. |

The compounds of Table I, when applied to the foliage of apple trees, in accordance with the procedure of Example 1, gives similar fungicidal control.

EXAMPLES 6–44

The following compounds of the present invention are also prepared in accordance with the procedure of Example 1 by substituting for the reactants of Example 1 equimolar amounts of the reactants set forth in Table II:

Table II

| Example | $R-X-\overset{X}{\underset{\|}{C}}-Cl$ Used | Amine used | Product obtained |
|---|---|---|---|
| 6 | allylchloroformate | 2-aminobenzothiazole | 2-carboxyimino-3-benzothiazoline-carboxylic acid diallyl ester. |
| 7 | thiolmethylchloroformate | do | thiol-2-thiolcarboxyimino-3-benzothiazoline carboxylic acid dimethyl ester. |
| 8 | thionomethylchloroformate | do | thiono-2-thionocarboxyimino-3-benzothiazolinecarboxylic acid dimethyl ester. |
| 9 | dithiomethylchloroformate | do | dithio-2-dithiocarboxyimino-3-benzothiazolinecarboxylic acid dimethyl ester. |
| 10 | thiolethylchloroformate | do | thiol-2-thiolcarboxyimino-3-benzothiazoline carboxylic acid diethyl ester. |
| 11 | thionoallylchloroformate | do | thiono-2-thionocarboxyimino-3-benzothiazolinecarboxylic acid diallyl ester. |
| 12 | dithioethylchloroformate | do | dithio-2-dithiocarboxyimino-3-benzothiazolinecarboxylic acid diethyl ester. |
| 13 | dithiobutylchloroformate | do | dithio-2-dithiocarboxyimino-3-benzothiazolinecarboxylic acid dibutyl ester. |
| 14 | isopropylchloroformate | do | 2-carboxyimino-3-benzothiazolinecarboxylic acid diisopropyl ester. |
| 15 | ethylchloroformate | 2-aminobenzoxazole | 2-carboxyimino-3-benzoxazolinecarboxylic acid diethyl ester. |
| 16 | thiolmethylchloroformate | do | thiol-2-thiolcarboxyimino-3-benzoxazoline carboxylic acid dimethyl ester. |
| 17 | thionomethylchloroformate | do | thiono-2-thionocarboxyimino-3-benzoxazoline carboxylic acid dimethyl ester. |
| 18 | dithiomethylchloroformate | do | dithio-2-dithiocarboxyimino-3-benzoxazoline carboxylic acid dimethyl ester. |
| 19 | thionoallylchloroformate | do | thiono-2-thionocarboxyimino-3-benzoxazoline carboxylic acid diallyl ester. |
| 20 | methylchloroformate | 2-amino-6-chlorobenzothiazole | 2-carboxyimino-3-(6-chlorobenzothiazoline)-carboxylic acid dimethyl ester. |
| 21 | ethylchloroformate | 2-amino-4-chlorobenzothiazole | 2-carboxyimino-3-(4-chlorobenzothiazoline)-carboxylic acid diethyl ester. |
| 22 | propylchloroformate | 2-amino-5-chlorobenzothiazole | 2-carboxyimino-3-(5-chlorobenzothiazoline)-carboxylic acid dipropyl ester. |
| 23 | sec. butylchloroformate | 2-amino-6-fluorobenzothiazole | 2-carboxyimino-3-(6-fluorobenzothiazoline)-carboxylic acid di-sec. butyl ester. |
| 24 | thiolmethylchloroformate | 2-amino-4-bromobenzothiazole | thiol-2-thiolcarboxyimino-3-(4-bromobenzothiazoline)carboxylic acid dimethyl ester. |
| 25 | thionomethylchloroformate | 2-amino-6-iodobenzothiazole | thiono-2-thionocarboxyimino-3-(6-iodobenzothiazoline)carboxylic acid dimethyl ester. |
| 26 | dithiomethylchloroformate | 2-amino-6-chlorobenzothiazole | dithio-2-dithiocarboxyimino-3-(6-chlorobenzothiazoline)carboxylic acid dimethyl ester. |
| 27 | thiolmethylchloroformate | 2-amino-5-chlorobenzothiazole | thiol-2-thiolcarboxyimino-3-(5-chlorobenzothiazoline)carboxylic acid dimethyl ester. |
| 28 | methylchloroformate | 2-amino-6-nitrobenzothiazole | 2-carboxyimino-2-(6-nitrobenzothiazoline)carboxylic acid dimethyl ester. |
| 29 | ethylchloroformate | 2-amino-4-nitrobenzothiazole | 2-carboxyimino-3-(4-nitrobenzothiazoline)carboxylic acid diethyl ester. |
| 30 | thiolmethylchloroformate | 2-amino-5-nitrobenzothiazole | thiol-2-thiolcarboxyimino-3-(5-nitrobenzothiazoline)carboxylic acid dimethyl ester. |
| 31 | thionomethylchloroformate | 2-amino-5,6-dichlorobenzothiazole | thiono-2-thionocarboxyimino-3-(5,6-dichlorobenzothiazoline)carboxylic acid dimethyl ester. |
| 32 | dithiomethylchloroformate | 2-amino-5,6,7-trichlorobenzothiazole | dithio-2-dithiocarboxyimino-3-(5,6,7-trichlorobenzothiazoline)carboxylic acid dimethyl ester. |
| 33 | dithiodibutylchloroformate | 2-amino-4-chloro-6-nitrobenzothiazole | dithio-2-dithiocarboxyimino-3-(4-chloro-6-nitrobenzothiazoline)carboxylic acid dibutyl ester. |
| 34 | thiolpropylchloroformate | 2-amino-4-nitro-6-chlorobenzothiazole | thiol-2-thiolcarboxyimino-3-(4-nitro-6-chlorobenzothiazoline)carboxylic acid dipropyl ester. |
| 35 | thionobutylchloroformate | 2-amino-4-chloro-5-nitrobenzothiazole | thiono-2-thionocarboxyimino-3-(4-chloro-5-nitrobenzothiazoline)carboxylic acid dibutyl ester. |
| 36 | methylchloroformate | 2-amino-5,6-dichlorobenzothiazole | 2-carboxyimino-3-(5,6-dichlorobenzothiazoline)-carboxylic acid dimethyl ester. |
| 37 | thiolmethylchloroformate | do | thiol-2-thiolcarboxyimino-3-(5,6-dichlorobenzothiazoline)carboxylic acid dimethyl ester. |
| 38 | methylchloroformate | 2-amino-5-chlorobenzoxazole | 2-carboxyimino-3-(5-chlorobenzoxazoline) carboxylic acid dimethyl ester. |
| 39 | do | 2-amino-5,7-dichlorobenzoxazole | 2-carboxyimino-3-(5,7-dichlorobenzoxazoline)-carboxylic acid dimethyl ester. |
| 40 | thiolmethylchloroformate | 2-amino-5-nitrobenzoxazole | thiol-2-thiolcarboxyimino-3-(5-nitrobenzoxazoline)carboxylic acid dimethyl ester. |
| 41 | dithiomethylchloroformate | 2-amino-5-chloro-7-nitrobenzoxazole | dithio-2-dithiocarboxyimino-3-(5-chloro-7-nitrobenzoxazoline)carboxylic acid dimethyl ester. |
| 42 | ethylchloroformate | 2-amino-4,7-dibromobenzoxazole | 2-carboxyimino-3-(4,7-dibromobenzoxazoline)-carboxylic acid diethyl ester. |
| 43 | butylchloroformate | 2-amino-5-fluoro-7-nitrobenzoxazole | 2-carboxyimino-3-(5-fluoro-7-nitrobenzoxazoline)carboxylic acid dibutyl ester. |
| 44 | allylchloroformate | 2-amino-4,5,7-trichlorobenzoxazole | 2-carboxyimino-3-(4,5,7-trichlorobenzoxazoline)carboxylic acid diallyl ester. |

EXAMPLE 45

A stirring suspension of 208 parts by weight of 2-benzothiazole carbamic acid, methyl ester and 101 parts by weight of triethylamine contained in 1500 parts by weight of dioxane is treated gradually with 108.5 parts by weight of allyl chloroformate. Stirring is continued until the reaction has a neutral pH. At this point, the reaction is diluted with 4500 parts by weight of water. Essentially pure 2-carboxyimino-3-benzothiazolinecarboxylic acid, 3-allyl-2-methyl ester precipitates out of solution.

EXAMPLES 46–69

The compounds in Table III are prepared similarly by substituting equivalent amounts of the reagents listed below for 2-benzothiazolecarbamic acid methyl ester and allyl chloroformate of Example 45 above.

EXAMPLE 76

The following wettable powder composition is diluted with water to give a 0.2% concentration of the active ingredient. The resultant composition, when sprayed on tomato foliage, prevents infection by early blight (*Alternaria solani*).

| | Percent |
|---|---|
| Thiono - 2 - thionocarboxyimino - 3 - (5,6 - dichlorobenzothiazoline)carboxylic acid dimethyl ester | 20.0 |
| Sodium lauryl sulfate | 0.5 |
| Sodium lignin sulfonate | 1.0 |
| Kaolin clay | 48.5 |

EXAMPLE 77

The following wettable powder when dispersed in water at a concentration of 2 pounds per 100 gallons of water and sprayed on tomato foliage at a rate of 100 gallons per acre, prevents early blight (*Alternaria solani*).

| | Percent |
|---|---|
| Dithio - 2 - dithiocarboxyimino - 3 -(5 - chloro-7-nitrobenzoxazoline)carboxylic acid dimethyl ester | 80.00 |
| Alkyl naphthalene sulfonic acid sodium salt | 0.75 |
| Low viscosity methyl cellulose | 0.25 |
| Silica | 19.00 |

EXAMPLE 78

A fungicidal dust composition of (2-carboxyimino-3-(5-fluoro-7-nitrobenzoxazoline)carboxylic acid dibutyl ester) is prepared. When dusted on apple trees at the rate of 10 pounds of active ingredient per acre, powdery mildew is controlled (*Podosphaera leucotricha*).

| | Percent |
|---|---|
| 2 - carboxyimino - 3 - (5 - fluoro - 7 - nitrobenzoxazoline)carboxylic acid dibutyl ester | 20 |
| Stearated calcium carbonate | 80 |

*Table III*

| Example | $R-X-\overset{X}{\underset{\|}{C}}-Cl$ Used | Carbamic Acid Ester Used | Product Obtained |
|---|---|---|---|
| 46 | ethylchloroformate | 2-benzothiazole carbamic acid, methyl ester. | 2-carboxyimino-3-benzothiazoline carboxylic acid-3-ethyl-2-methyl ester. |
| 47 | propylchloroformate | ---do--- | 2-carboxyimino-3-benzothiazoline carboxylic acid-3-propyl-2-methyl ester. |
| 48 | butylchloroformate | ---do--- | 2-carboxyimino-3-benzothiazoline carboxylic acid-3-butyl-2-methyl ester. |
| 49 | ethylchloroformate | 2-benzoxazole carbamic acid, methyl ester. | 2-carboxyimino-3-benzoxazoline carboxylic acid-3-ethyl-2-methyl ester. |
| 50 | propylchloroformate | ---do--- | 2-carboxyimino-3-benzoxazoline carboxylic acid-3-propyl-2-methyl ester. |
| 51 | allylchloroformate | ---do--- | 2-carboxyimino-3-benzoxazoline carboxylic acid-3-allyl-2-methyl ester. |
| 52 | methylchloroformate | 2-benzothiazole carbamic acid, ethyl ester. | 2-carboxyimino-3-benzothiazoline carboxylic acid-3-methyl-2-ethyl ester. |
| 53 | propylchloroformate | ---do--- | 2-carboxyimino-3-benzothiazoline carboxylic acid-3-propyl-2-ethyl ester. |
| 54 | methylchloroformate | 2-benzoxazole carbamic acid, ethyl ester. | 2-carboxyimino-3-benzoxazoline carboxylic acid-3-methyl-2-ethyl ester. |
| 55 | thiolethylchloroformate | thiol - 2 - benzothiazole carbamic acid, methyl ester. | thiol-2-thiolcarboxyimino-3-benzothiazoline carboxylic acid-3-ethyl-2-methyl ester. |
| 56 | thiolbutylchloroformate | ---do--- | thiol-2-thiolcarboxyimino-3-benzothiazoline carboxylic acid-3-butyl-2-methyl ester. |
| 57 | thionoallylchloroformate | thiono-2-benzothiazole carbamic acid methyl ester. | thiono-2-thionocarboxyimino-3-benzothiazoline carboxylic acid-3-allyl-2-methyl-ester. |
| 58 | thionopropylchloroformate | ---do--- | thiono-2-thionocarboxyimino-3-benzothiazoline carboxylic acid-3-propyl-2-methyl ester. |
| 59 | dithioethylchloroformate | dithio-2-benzothiazole carbamic acid methyl ester. | dithio-2-dithiocarboxyimino-3-benzothiazoline carboxylic acid-3-ethyl-2-methyl ester. |
| 60 | dithiopropylchloroformate | ---do--- | dithio-2-dithiocarboxyimino-3-benzothiazoline carboxylic acid-3-propyl methyl ester. |
| 61 | dithiomethylchloroformate | dithio-2-benzothiazole carbamic acid butyl ester. | dithio-2-dithiocarboxyimino-3-benzothiazoline carboxylic acid-3-methyl-2-butyl ester. |
| 62 | dithiobutylchloroformate | ---do--- | dithio-2-dithiocarboxyimino-3-benzothiazoline carboxylic acid-dibutyl ester. |
| 63 | thiolethylchloroformate | thiol-2-benzoxazole carbamic acid methyl ester. | thiol-2-thiolcarboxyimino-3-benzoxazoline carboxylic acid-3-ethyl-2-methyl ester. |
| 64 | thionopropylchloroformate | thiono - 2 - benzoxazole carbamic acid methyl ester. | thiono-2-thionocarboxyimino-3-benzoxazoline carboxylic acid-3-propyl-2-methyl ester. |
| 65 | dithiobutylchloroformate | dithio - 2 - benzoxazole carbamic acid methyl ester. | dithio-2-dithiocarboxyimino-3-benzoxazoline carboxylic acid-3-butyl-2-methyl ester. |
| 66 | ethylchloroformate | 2-(4-nitrobenzothiazole) carbamic acid methyl ester. | 2-carboxyimino-3-(4-nitrobenzothiazoline)carboxylic acid-3-ethyl-2-methyl ester. |
| 67 | methylchloroformate | 2-(4-chlorobenzothiazole) carbamic acid ethyl ester. | 2-carboxyimino-3-(4-chlorobenzothiazoline)carboxylic acid-3-methyl-2-ethyl ester. |
| 68 | ---do--- | 2-(5,6-dichlorobenzothiazole) carbamic acid allyl ester. | 2-carboxyimino-3-(5,6-dichlorobenzothiazoline)carboxylic acid-3-methyl-2-allyl ester. |
| 69 | butylchloroformate | 2-(4-nitro-6-chlorobenzothiazole) carbamic acid methyl ester. | 2-carboxyimino-3-(4-nitro-6-chlorobenzothiazoline) carboxylic acid-2-methyl-3-butyl ester. |

The following list is further illustrative of the fungicidally active compounds of the invention. These compounds are prepared by the methods of Examples 1–69 using appropriate reagents. They are formulated into fungicidal compositions and used by substituting them for the active ingredients of the compositions of the above examples.

| Example | |
|---|---|
| 70 | 2-carboxyimino-3-(7-nitro-5-chlorobenzoxazoline)-carboxylic acid-2-methyl-3-propyl ester. |
| 71 | 2-carboxyimino-3-(5-chlorobenzoxazoline) carboxylic acid-2-ethyl-3-butyl ester. |
| 72 | thiol-2-thiolcarboxyimino-3-(5-nitrobenzoxazoline)-carboxylic acid-2-methyl-3-allyl ester. |
| 73 | dithio-2-dithiocarboxyimino-3-(4,5,7-trichlorobenzoxazoline) carboxylic acid-2-methyl-3-ethyl ester. |
| 74 | thiono-2-thiolcarboxyimino-3-(6-nitrobenzothiazoline) carboxylic acid dimethyl ester. |
| 75 | thiono-2-thiolcarboxyimino-3-(5-chlorobenzoxazoline) carboxylic acid dimethyl ester. |

EXAMPLE 79

2 - carboxyimino - 3 - benzothiazolinecarboxylic acid dimethyl ester is applied to tomato foliage as an aqueous dispersion at a concentration of 0.2%. When the spray deposit dries, the foliage is inoculated with the spores of the early blight fungus (*Alternaria solani*). After a suitable incubation time the leaves are examined for disease. It is found that the treated leaves have no disease while untreated control leaves have 100% disease. The same compound is applied to apple foliage as an aqueous suspension at a concentration of 0.008%. When the spray deposit has dried, the plants are exposed to infection by the spores of apple powdery mildew (*Podosphaera leucotricha*). After a suitable incubation period it is found that the treated plants have only 10% infection whereas untreated control plants have 100% infection.

The same compound is applied as an aqueous dispersion in a concentration of 10 p. p. m. to sand in which cucumber plants are growing. One week later the cucumber plants are exposed to infection by powdery mildew (*Erysiphe cichoracearum*). After a suitable incubation period the plants are examined for disease. It is found that treated plants have 0% disease whereas the untreated control plants have 100% disease.

EXAMPLE 80

This compound is formulated as a dust that is suitable for application by means of conventional dusting equipment by blending the listed ingredients together and passing them through a micropulverizer.

|  | Percent |
|---|---|
| 2 - carboxyimino - 3 - benzothiazolinecarboxylic acid methyl ester | 25 |
| Pyrophyllite | 75 |

This fungicidal composition, when dusted on tomato plants at a rate of 3 pounds per acre of active ingredient prevents infection by early blight (*Alternaria solani*).

EXAMPLE 81

2 - carboxyimino - 3 - benzothiazolinecarboxylic acid diethyl ester is formulated as a fungicidal dust having the following composition:

|  | Percent |
|---|---|
| 2 - carboxyimino - 3 - benzothiazolinecarboxylic acid diethyl ester | 20 |
| Tobacco dust | 80 |

This fungicidal dust is prepared by blending the listed ingredients and passing them through a micropulverizer. When the composition is dusted on pear trees at the rate of 10 pounds per acre of active ingredient, it is found to prevent powdery mildew (*Podosphaera leucotricha*).

EXAMPLE 82

2 - carboxyimino - 3 - benzothiazolinecarboxylic acid diallyl ester is formulated to a wettable powder fungicidal composition by blending the list of ingredients together and passing them twice through a micropulverizer. The resulting powder disperses readily in water to yield a fungicidal spray composition.

|  | Percent |
|---|---|
| 2 - carboxyimino - 3 - benzothiazolinecarboxylic acid diallyl ester | 80.00 |
| Alkyl naphthalene sulfonic acid sodium salt | 0.75 |
| Low viscosity methyl cellulose | 0.25 |
| Silica | 19.00 |

This wettable powder, when dispersed in water at a concentration of 6 pounds per 100 gallons of water and sprayed on tomato foliage at the rate of 100 gallons per acre, prevents infection by early blight (*Alternaria solani*).

EXAMPLE 83

Thio-2-thiolcarboxyimino - 3-benzothiazolinecarboxylic acid dimethyl ester is prepared as a wettable powder of the following composition:

|  | Percent |
|---|---|
| Thiol-2-thiolcarboxyimino - 3 - benzothiazolinecarboxylic acid dimethyl ester | 80.00 |
| Alkyl naphthalene sulfonic acid sodium salt | 0.75 |
| Low viscosity methyl cellulose | 0.25 |
| Diatomaceous earth | 19.00 |

This wettable powder, when dispersed in water at a concentration of 2 pounds per 100 gallons of water and sprayed on apple trees at a rate of 100 gallons per acre prevents infection by apple scab (*Venturia inaequalis*).

EXAMPLE 84

Dithio-2-dithiocarboxyimino - 3-benzothiazolinecarboxylic acid diethyl ester is prepared as a wettable powder of the following composition:

|  | Percent |
|---|---|
| Dithio-2-dithiocarboxyimino - 3 - benzothiazolinecarboxylic acid diethyl ester | 50.0 |
| Sodium lauryl sulfate | 0.5 |
| Sodium lignin sulfonate | 1.0 |
| Kaolin clay | 48.5 |

When dispersed in water at a concentration of 2 pounds per 100 gallons of water and sprayed on tomato foliage at the rate of 300 gallons per acre, early blight is prevented (*Alternaria solani*).

Additional fungicidal compositions are prepared in accordance with Examples 76 to 84 by replacing the active ingredients of the compositions of these examples with equal part by weight of the compounds of Examples 1 to 75. These compositions, when used in accordance with Examples 76 to 84, give similar fungicidal control.

We claim:

1. A compound represented by the formula

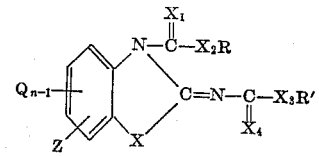

wherein Z is selected from the group consisting of hydrogen and nitro; Q is a halogen; $n$ is a whole positive integer of less than 4; X, $X_1$, $X_2$, $X_3$ and $X_4$ are selected from the group consisting of oxygen and sulfur; and R and R' are selected from the group consisting of alkyl and alkenyl radicals containing less than 5 carbon atoms.

2. A compound in accordance with claim 1 in admixture with an inert solid.

3. A compound in accordance with claim 1 in admixture with a surface-active agent.

4. The method for the control of fungi comprising applying to the organic material to be protected, in a fungicidally effective amount, a compound in accordance with claim 1.

5. The process of preparing a compound of claim 1 comprising introducing into a reaction zone, water as an aqueous reaction medium, a heterocyclic amine hydrochloride and a chloroformate; maintaining the temperature of the aqueous reaction medium within the range from 20–60° C. during the reaction period; maintaining the aqueous reaction medium at a pH within the range of pH 2.0 to 6.0 during the reaction period; and separating the resultant product that precipitates from the reaction medium, said heterocyclic amine being selected from the group represented by the formula
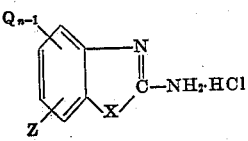
and said chloroformate being selected from the group represented by the formula
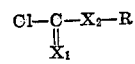
wherein said substituent letters have the same significance as in claim 1.
No references cited.